(12) United States Patent
Uhlhorn et al.

(10) Patent No.: US 8,218,965 B1
(45) Date of Patent: Jul. 10, 2012

(54) OPTICAL FAILOVER ROUTING

(75) Inventors: Brian L. Uhlhorn, Saint Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 475 days.

(21) Appl. No.: 12/476,165

(22) Filed: Jun. 1, 2009

(51) Int. Cl.
- H04J 1/16 (2006.01)
- H04J 3/14 (2006.01)
- G06F 15/16 (2006.01)
- H04L 12/56 (2006.01)

(52) U.S. Cl. ......... 398/2; 398/1; 398/3; 398/4; 370/225; 370/223; 370/222; 370/228

(58) Field of Classification Search .................. 398/1, 2, 398/61; 370/225
See application file for complete search history.

(56) References Cited

U.S. PATENT DOCUMENTS

| | | | |
|---|---|---|---|
| 5,592,477 A | 1/1997 | Farris et al. | |
| 6,026,086 A | 2/2000 | Lancelot et al. | |
| 6,819,870 B1 | 11/2004 | Ge et al. | |
| 6,963,564 B1 | 11/2005 | Liu | |
| 7,188,189 B2 * | 3/2007 | Karol et al. | 709/238 |
| 7,200,150 B2 | 4/2007 | Lewis | |
| 2002/0118420 A1 | 8/2002 | Liu | |
| 2002/0122644 A1 * | 9/2002 | Birks et al. | 385/125 |
| 2004/0052525 A1 * | 3/2004 | Ovadia | 398/47 |
| 2004/0114595 A1 * | 6/2004 | Doukai | 370/389 |
| 2008/0198849 A1 * | 8/2008 | Guichard et al. | 370/392 |

* cited by examiner

Primary Examiner — Shi K Li
Assistant Examiner — Oommen Jacob
(74) Attorney, Agent, or Firm — Brooks, Cameron & Huebsch, PLLC (57) ABSTRACT

Apparatuses, systems, and methods of routing data through an optical network are disclosed. One such method includes transmitting optical data via a first fiber optic network from an originating node on a first level to a second level, receiving the optical data at a destination node on a third level from the second level via a second fiber optic network, wherein the second level, connected to the first fiber optic network and the second fiber optic network, includes a first intermediate node as a primary route on the second level for transmitting the optical data from the originating node to the destination node, and a second intermediate node as an alternate route on the second level for transmitting the optical data from the originating node to the destination node when the first intermediate node fails.

19 Claims, 4 Drawing Sheets

OPTICAL FAILOVER ROUTING

FIELD OF THE DISCLOSURE

The present disclosure generally relates to optical signals. And, in particular, the present disclosure relates to routing data through an optical network.

BACKGROUND

The interconnections that define communication networks can trace their origins to a web of metal conductors strung point-to-point. As communication needs have risen, fiber optic cabling has replaced metallic conductors in an effort to meet the demand for additional bandwidth, first using multi-mode and then single-mode optical fiber. Although the conductor capacity has changed over the years, much of the point-to-point topology, functionality, and associated limitations have been retained.

The configuration of a communications network can be dynamic, changing over time as devices are added and removed from the network, whether these changes are done intentionally or unintentionally (e.g., due to failure). Therefore, the path from one device to another may change periodically, for example due to network configuration change, congestion along a particular route, or for some other reason.

Data can be communicated over a communications network as discrete packets. Each packet of data can typically also include destination address information (e.g., in a header which might include other administrative information). Certain network devices (e.g., routers) can use a packet's destination information (e.g., from the packet's header) along with routing table information, to determine how to route each packet, e.g., where next to send a packet, on a communications network.

In communication networks it is likely that at some point, a cable or router will eventually fail or become overloaded and unable to forward packets. The communications network can failover to an alternative router (e.g., use an alternative router to transmit the data) to allow the communications network to continue to function.

For example, packets can travel from an originating router to a destination router and through a primary router. When the primary router fails, the originating router must wait for an update or discovery of the failure before it can update itself and start sending the packets through an alternate router.

Discovering the failure of the primary router and sending packets through the alternate router can require additional overhead to determine what packets were lost in the failure of the primary router. Also, the destination router may send an administrative request back to the originating router through the alternate router when it decides that the primary router has failed. The primary router can then send the packets again, but use the alternate router to transfer the packets to the destination router.

In another example, the originating router can forward packets to both the primary router and the alternate router. Once the primary router has failed and the failure has been detected, the alternate router can transmit the packets without having to forward the request back to the originating router.

In sending packets to both the primary router and the alternate router, the communications network has the added difficulty of determining how long the packets must be stored in the alternate router before being discarded. This difficulty can be solved, but requires increasing the overhead (e.g., additional executable instructions for handling the packets and storage space for the packets) and having the destination router send additional acknowledgements to the alternate router.

SUMMARY

Embodiments of the present disclosure include apparatuses, systems, and methods for optical failover routing. Various embodiments can send optical data from an originating node to a destination node via a number of fiber optic networks, wherein the optical data is sent through a first intermediate node and wherein the optical data is sent through a second intermediate node when the first intermediate node fails. Embodiments of the present disclosure can be utilized for various applications such as optical computing, sensing, and/or communications network systems, among others.

In various embodiments, an optical network includes an originating node, a destination node, a first intermediate node, and a second intermediate node. The originating node can be communicatively coupled to a first intermediate node and a second intermediate node by a first fiber optic network and the first intermediate node and the second intermediate node can be communicatively coupled to the destination node by a second fiber optic network.

In some such embodiments, the originating node can be configured to transmit optical data to the destination node through the first intermediate node via the first and second fiber optic networks. In some such embodiments, the second intermediate node can act as a failover to transmit the optical data from the originating node to the destination node via the first and second fiber optic networks when the first intermediate node fails to transmit the optical data from the originating node to the destination node.

In various embodiments, the originating node can broadcast the optical data to the first intermediate node and the second intermediate node substantially simultaneously via the first fiber optic network. The second intermediate node can be configured to temporarily store the optical data when the optical data is broadcast from the originating node.

In various embodiments, the first intermediate node can be configured to broadcast a forwarding notice after transmitting the optical data from the originating node to the destination node and the second intermediate node can be configured to discard the optical data temporarily stored after receipt of the forwarding notice. In various embodiments, the second intermediate node can be configured to transmit the optical data to the destination node if a forwarding notice is not received within a set time period after receiving the optical data from the originating node.

In some such embodiments, the second intermediate node can be further configured to broadcast a failover acknowledgment after transmitting the optical data. The network can be configured to modify routing information to bypass the first intermediate node after a set number of failover acknowledgements have been transmitted.

In various embodiments, the destination node can be configured to broadcast a receipt acknowledgement to the first and second intermediate nodes after receiving the optical data and the second intermediate node can be configured to discard the optical data temporarily stored after receiving the receipt acknowledgement.

In various embodiments, the second intermediate node can be configured to transmit the optical data to the destination node if a receipt acknowledgement is not received within a certain time period after receiving the optical data and broadcast a failover acknowledgment after transmitting the optical data.

In various embodiments, the originating node, the destination node, the first intermediate node, and the second intermediate node can each include a router. In some embodiments, the first fiber optic network and the second fiber optic network can be single-mode fiber optic links with star couplers.

In various embodiments, a computing system can include a processor, a memory in communication with the processor, an optical communication system in communication with the processor, and executable instructions stored in the memory and executed by the processor. In some such embodiments, the optical communication system can have an originating node connected to a first intermediate node and a second intermediate node by a first fiber optic network. A destination node can be connected to the first intermediate node and the second intermediate node by a second fiber optic network.

In various embodiments, the executable instructions stored in the memory can be executed by the processor to transmit optical data from the originating node to the destination node through the first intermediate node via the first and second fiber optic networks. In some such embodiments, the executable instructions stored in the memory can be executed by the processor transmit the optical data from the originating node to the destination node through the second intermediate node via the first and second fiber optic networks when the first intermediate node fails to transmit the optical data from the originating node to the destination node.

In various embodiments, the second intermediate node can be configured to broadcast a failover acknowledgment after transmitting the optical data from the originating node to the destination node. The optical communication system can be configured to modify routing information to bypass the first intermediate node after a set number of failover acknowledgements have been broadcast.

Various method embodiments for routing data through an optical network provided in the present disclosure include defining multiple levels of nodes wherein at least one level is made up of nodes within a first network and at least one level is made up of nodes within a second network, transmitting optical data via a first fiber optic network from an originating node on a first level to a second level and receiving the optical data at a destination node on a third level from the second level via a second fiber optic network. In some such embodiments, the second level is connected to the first fiber optic network and the second fiber optic network. The second level can include a first intermediate node as a primary route on the second level for transmitting the optical data from the originating node to the destination node and a second intermediate node as an alternate route on the second level for transmitting the optical data from the originating node to the destination node when the first intermediate node fails.

In various embodiments, transmitting the optical data via the first fiber optic network includes broadcasting the optical data to the first intermediate node and the second intermediate node.

In various embodiments, the optical data can be temporarily stored on the second intermediate node when the optical data is transmitted from the originating node in the first level to the second level. In some such embodiments, a forwarding notice can be broadcast when the primary route is used for transmitting the optical data from the originating node to the destination node and the optical data temporarily stored on the second intermediate node can be discarded after receipt of the forwarding notice. The alternative route for transmitting the optical data from the originating node to the destination node can be used when a forwarding notice is not timely received at the second intermediate node.

In various embodiments, a receipt acknowledgement can be broadcast when the destination node receives the optical data and the optical data temporarily stored on the second intermediate node can be discarded after receiving the receipt acknowledgement from the destination node. The alternative route for transmitting the optical data from the originating node to the destination node can be used when a receipt acknowledgement is not timely received at the second intermediate node.

In various embodiments, a failover acknowledgement can be broadcast when the alternate route is used to transmit the optical data from the originating node to the destination node. In some such embodiments, information can be modified to include the second intermediate node as a new primary route for transmitting the optical data from the originating node to the destination node when a set number of failover acknowledgements have occurred.

DETAILED DESCRIPTION

Embodiments of the present disclosure include apparatuses, systems, and methods for routing data through an optical network. Various embodiments discuss failover routing structures on broadcast networks.

Embodiments of the present disclosure are described in relation to the accompanying drawings, which will at least assist in illustrating the various features of the various embodiments. In the Figures, the first digit of a reference number refers to the Figure in which it is used, while the remaining two digits of the reference number refer to the same or equivalent parts of embodiment(s) of the present disclosure used throughout the several figures of the drawing. The scaling of the figures does not represent precise dimensions and/or dimensional ratios of the various elements illustrated herein.

Figure 1:
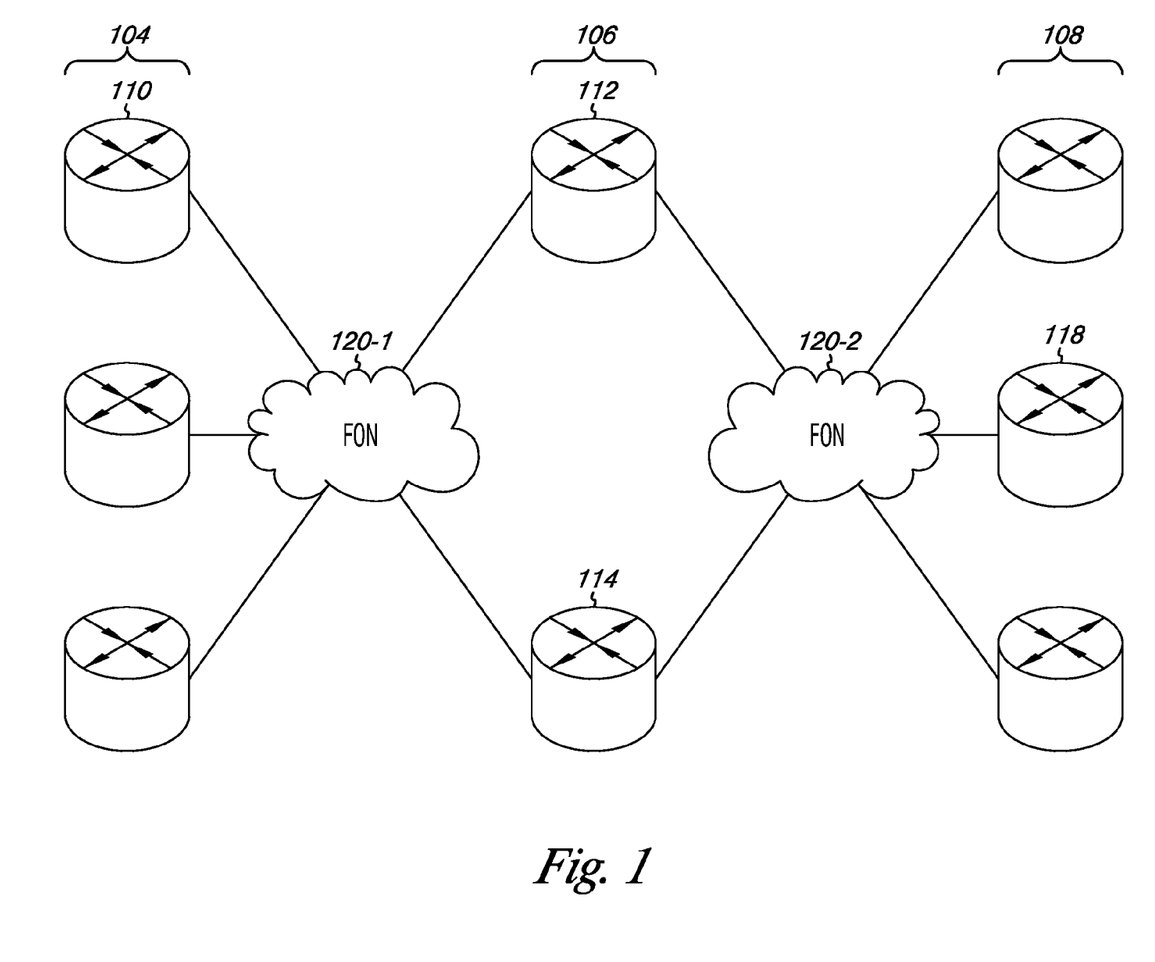
FIG. 1 illustrates an optical network communication system having a fiber optic network topology according to an embodiment of the present disclosure.

FIG. 1 illustrates an optical (e.g., photonic) network communication system having a fiber optic network topology according to an embodiment of the present disclosure. In the embodiment illustrated in FIG. 1, the optical network communication system includes a number of interconnected nodes, such as originating node 110, first intermediate node 112, second intermediate node 114, and destination node 118.

Originating node 110, first intermediate node 112, second intermediate node 114, and destination node 118 can be operable routers, and FIG. 1 shows the network nodes arranged in levels (e.g., layers) of nodes. Levels can, for example be defined by the functionality of the node with respect to a particular network.

For example, nodes that only communicate with other nodes within a network can be part of one level and nodes that communicate with one or more nodes of a different network can be part of another level, in some embodiments. Such a structure can allow for executable instructions regarding failover to be provided to nodes of a particular level and other specialized functions to be provided by executable instructions on nodes of another level.

In various embodiments, originating node 110, first intermediate node 112, second intermediate node 114, and destination node 118 can each be routers. Originating node 110 is in first node level 104, first intermediate node 112 and second intermediate node 114 are in second node level 106, and destination node 118 are in third node level 108.

In such an embodiments, first node level 104, second node level 106, and third node level 108 are interconnected using fiber optic circuits. In various embodiments, each node level can include multiple nodes. In one or more embodiments, a number of levels can be used and one of ordinary skill in the art would recognize how to implement more or less than three levels in an optical network communication system.

In the embodiment illustrated in FIG. 1, the nodes of adjacent node levels are communicatively coupled through a broadcast enabled fiber optic network (e.g., 120-1 and 120-2). As illustrated in FIG. 1, first node level 104 and second node level 106 are communicatively coupled through first fiber optic network 120-1 and second node level 106 and third node level 108 are communicatively coupled through first fiber optic network 120-2.

Nodes on a node level can be connected through a fiber optic network to nodes of an adjacent node level, which in turn may be connected through other fiber optic networks to further intermediate nodes and/or destination nodes, among others. Originating node 110 may be one node among multiple nodes in first node level 104.

In various embodiments, one or more nodes in each level of nodes may be communicatively coupled to one or more nodes of an adjacent level of nodes through a broadcast enabled fiber optic network (e.g., 120-1 and 120-2) as shown. According to one embodiment, all nodes in each level of nodes can be communicatively coupled to all nodes of an adjacent layer of nodes through a broadcast enabled fiber optic network (e.g., 120-1 and 120-2).

Fiber optic network 120-1 and fiber optic network 120-2 can be arranged as a single-mode fiber optic link having a star coupler topology. Such an interconnection configuration provides failover capability without increasing overhead over a point-to-point configuration, as will be explained further below.

In one or more embodiments, a packet which has to travel from originating node 110 to destination node 118 through the fiber optic networks 120-1 and 120-2 can include a primary path through intermediate node 112. With the use of broadcast enabled fiber optic networks 120-1 and 120-2 as an interconnection between first node level 104, second node level 106, and third node level 108, optical data is effectively broadcast when crossing the broadcast enabled fiber optic networks 120-1 and 120-2.

For example, packets originated from originating node 110 arrive at intermediate node 112 as well as intermediate node 114 by virtue of being broadcast across fiber optic network 120-1 in a substantially simultaneous manner, rather than being transmitted in a point-to-point fashion, as in previous approaches. This broadcasting can occur across a single-mode fiber optic link star coupler topology without additional cabling, transmissions, and/or re-transmission (as would be necessary to achieve the same broadcasting results with the point-to-point network configuration of previous approaches).

In various embodiments, fiber optic networks (e.g., photonic) networks are inherently a broadcast setup so data from a node on a first node level communicatively coupled to a second node level would automatically arrive at the nodes on the second node level without additional cabling or transmissions. The data, that is broadcast from a node on a first node level to the nodes on a second node level, may be temporarily stored on each of the nodes on the second node level.

When first intermediate node 112 forwards the optical data on to destination node 118, second intermediate node 114 also receives the information as a forwarding notice due to the broadcast nature of fiber optic network 120-2. Additionally, destination node 118 can broadcast a receipt acknowledgement over fiber optic network 120-2 upon receipt of the optical data from the first intermediate node 112 and the second intermediate node 114 can receive the receipt acknowledgement. Executable instructions are provided on the second intermediate node such that when second intermediate node 114 receives either the forwarding notice or the receipt acknowledgement, second intermediate node 114 can then discard the optical data temporarily stored based on the second intermediate node 114.

Executable instruction provided on the second intermediate node can be provided such that when first intermediate node 112 fails to forward on optical data or acknowledge the transmission in a timely fashion, second intermediate node 114 may immediately forward on the optical data it had temporarily stored reducing the time required for destination node 118 to receive the optical data. Second intermediate node 114 may then acknowledge the transmission back to originating node 110 and all nodes communicatively coupled to fiber optic network 120-1. In some embodiments, after a set number of failover acknowledgements, second intermediate node 114 may become the primary route. In such embodiments, first intermediate node 112 can be repaired and may gracefully enter back into the communication network, for example, by being used as a node for an alternate (e.g, failover) route.

Packet routing (e.g., optical data transfer) in the network shown in FIG. 1 is accomplished, in part, by transmitting routing protocol packets between nodes in order to keep network topology and preferred routing information current at each respective router based on the known configuration and operability of the network. For example, this might include periodic distribution of routing tables in a pro-active system scheme, or on-demand request packets in a reactive system scheme, or additional overhead information used in other routing protocols.

Because the network architecture implements a broadcast enabled fiber optic network configuration, the routing of administrative information can be transmitted out-of-band on a different channel than the user data packets. In some embodiments, routing information can be modified by a node in the network based on node performance. This can be beneficial for improving network performance based upon levelizing the network load across nodes or utilizing throughput in an underutilized node, among other benefits.

Communication networks need to accommodate connection (e.g., link) and/or router (e.g., node) failures, overloads, and/or other causes leading to inability of a network component to be able to properly forward packets. Devices within a network can detect a failure, and proceed to a failover configuration, such as by modifying network routing information to avoid the failed path and establish an alternate path in order to continue the communication function and discussed herein. For example, in FIG. 1, optical data that has to travel from originating node 110 to destination node 118 through a primary route which includes intermediate node 112. If intermediate node 112 fails, intermediate node 114 can transmit the optical data to destination node 118 on an alternate route.

Figure 2A:
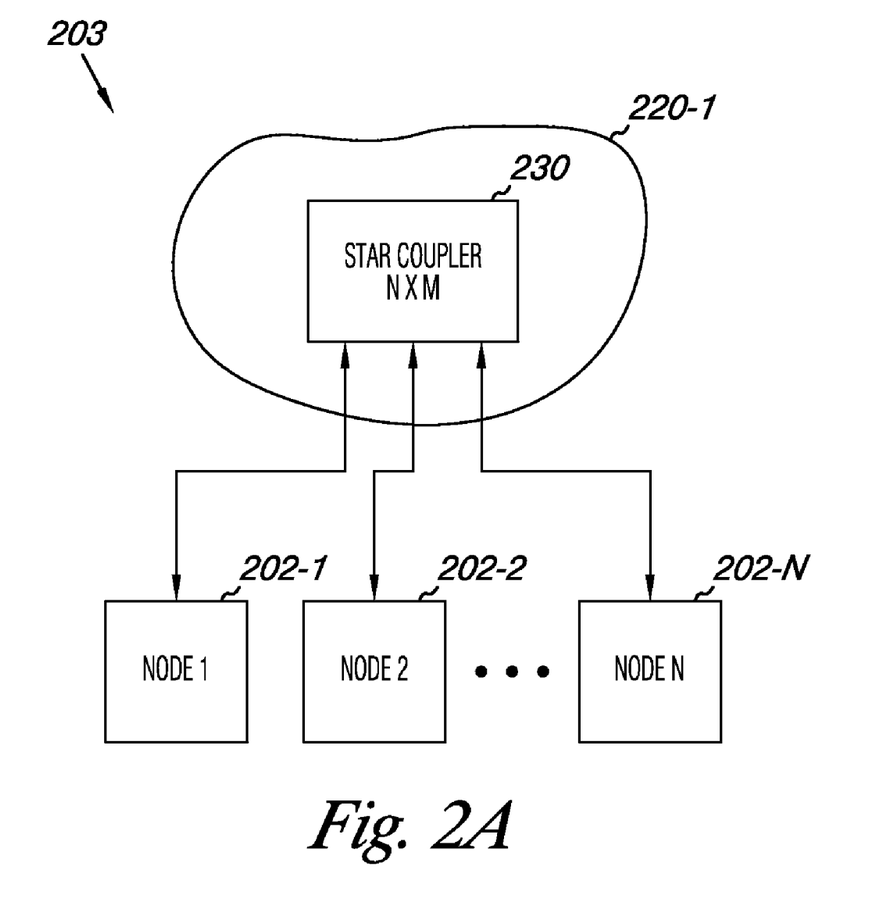
FIG. 2A illustrates an N node broadcast enabled fiber optic network according to an embodiment of the present disclosure.

FIG. 2A illustrates an N-node broadcast enabled fiber optic network 203 according to an embodiment of the present disclosure. Network 203 includes a number of nodes (e.g., 202-1, 202-2, . . . , 202-N) connected to a broadcast enabled fiber optic network (e.g., 220-1). Nodes 202-1, 202-2, . . . , 202-N may be routers (e.g., routers 120-1 and 120-2 as shown in FIG. 2) or some other optical network device as will be appreciated by those having ordinary skill in the art.

Broadcast enabled fiber optic network 220-1 may be implemented, for example, by an N×M star coupler 230 (only one layer of N nodes is shown, i.e., M nodes not shown). The quantity of M nodes may be the same or different than the quantity of N nodes.

Embodiments of the present disclosure are not limited to any particular quantity or arrangement of nodes. Additionally, the broadcast network 220-1 may be implemented using one or more other devices, methods, and/or configurations.

Embodiments of the present disclosure are not limited to use of a star coupler 230, and other coupler structures may be used. However, embodiments utilizing a star coupler may be beneficial as the connections formed between the nodes can provide better performance and lower latency due to the directness of the routes between nodes and the broadcast nature of the network communications.

Figure 2B:
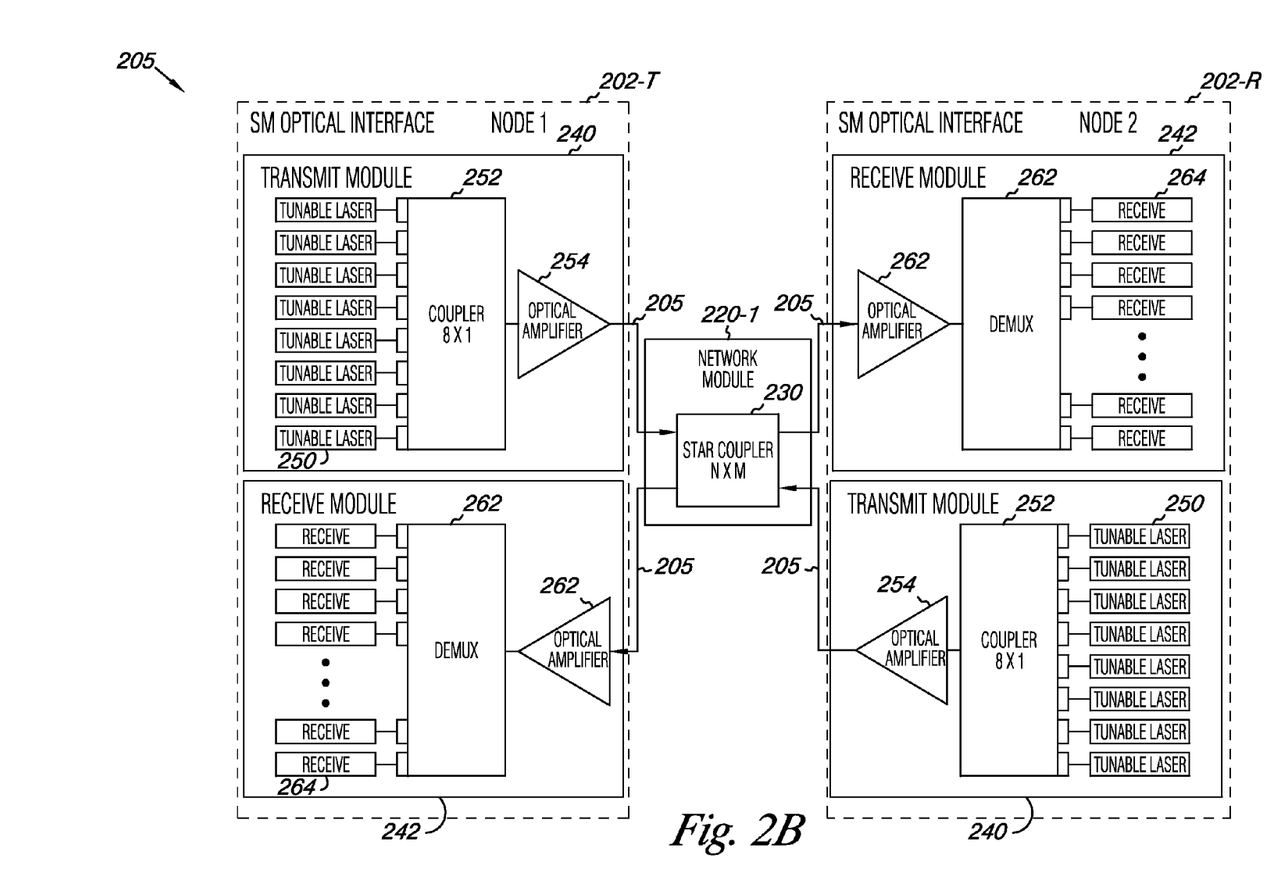
FIG. 2B illustrates a 1×1 node broadcast enabled fiber optic network according to an embodiment of the present disclosure.

FIG. 2B illustrates a 1×1 node broadcast enabled fiber optic network 205 according to an embodiment of the present disclosure. Two nodes (e.g., 202-T and 202-R) are connected to a broadcast enabled fiber optic network (e.g., network module 220-1) by fiber optic cables 205. The broadcast enabled fiber optic network (e.g., network module 220-1) is implemented using an N×M star coupler 230. As shown in FIG. 2B, N is equal to 1, and M is equal to 1. Each node (e.g., 202-T and 202-R) is a single-mode optical interface and includes a transmit module 240 and a receive module 242.

The transmit module 240 includes a number of tunable lasers 250 connected to a coupler 252 having an output connected into an optical amplifier 254. The output of the optical amplifier is communicatively coupled to the star coupler 230 by a single-mode fiber optic link (e.g., 205).

As shown in FIG. 2B, an 8×1 coupler 252 is used to multiplex 8 tunable lasers. However, embodiments of the present disclosure are not so limited, and other quantities of lasers and/or transmit module configurations are within the scope of the present disclosure.

The receive module 242 includes an optical amplifier 262 having an input communicatively coupled to the star coupler 230 by a single-mode fiber optic link (e.g., 205). The output of the optical amplifier 262 is connected to an optical demultiplexer 262.

Outputs from the demultiplexer 262 are connected to optical receive detectors 264, which may be tuned to different wavelengths. One skilled in the art will recognize that additional features have been omitted for clarity from FIG. 2B computing and/or processing capability, memory, logic, etc. For example, nodes 1 and 2 in FIG. 2B are shown as a single-mode optical interface (e.g., 202-T and 202-R). However, the single-mode optical interface may be a portion of a router, for example, with additional logic to further use the information contained in the administrative and/or data packets received. Other features associated with a router for example, are not shown in FIG. 2B.

The routing and storing functionalities of the embodiments of the present disclosure can be provided by instructions stored on a computing device readable medium or electronic device that can read executable instructions. For example, such instructions can, in various embodiments, be stored in hardware (e.g., an application-specific integrated circuit), firmware, and/or software (e.g., in memory) and, in some embodiments, be executed by a processor (e.g., of a computer) or other logic type circuitry.

Figure 3:
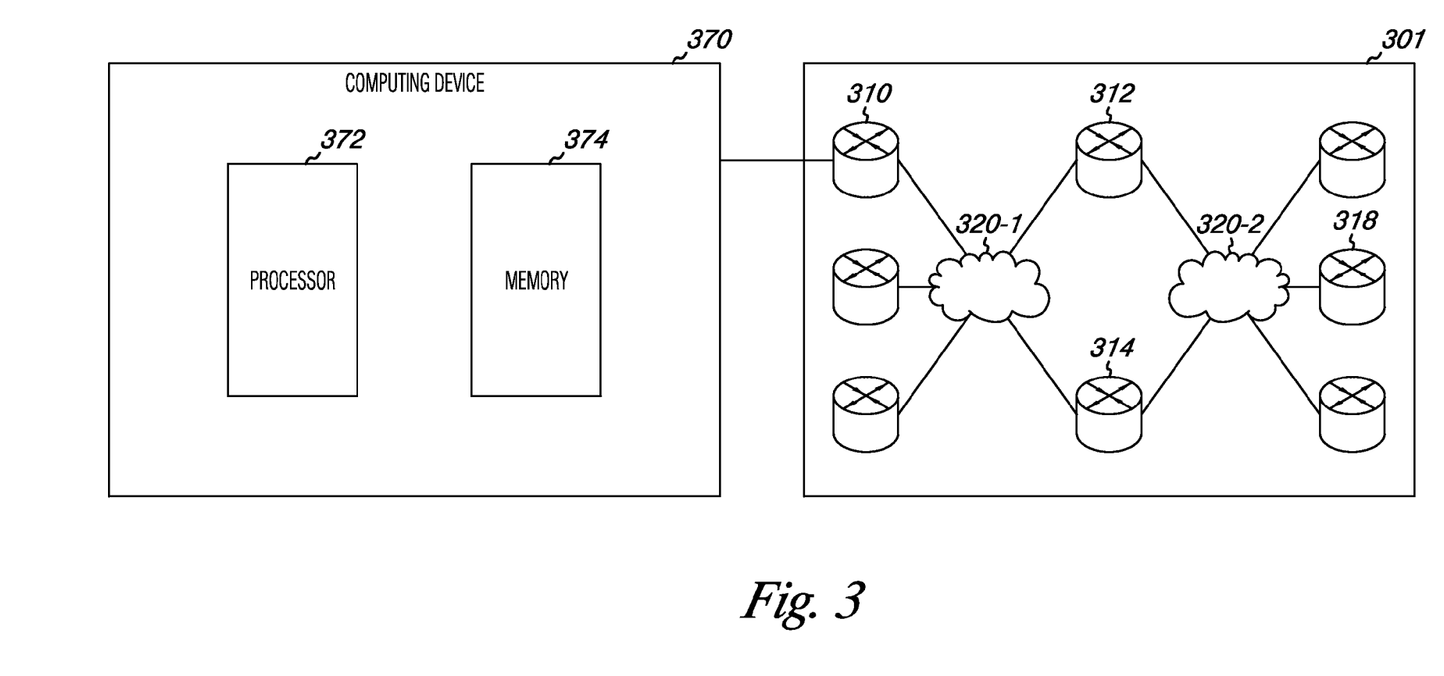
FIG. 3 illustrates a system having a computing device in communication with an optical network communication system having a fiber optic network topology according to an embodiment of the present disclosure.

FIG. 3 illustrates a system having a computing device in communication with an optical network communication system having a fiber optic network topology according to an embodiment of the present disclosure. In FIG. 3, the computing device 370 can include a processor 372 and memory 374. In one or more embodiments, the computing device 370 can include one or more processors and one or more memory modules.

The computing device 370 can be communicatively coupled to an optical network communication system 301. In FIG. 3, the computing device 370 is coupled to originating node 310. The computing device can store and execute commands that transmit data to and/or from originating node 310.

The optical network communication system 301 can include a number of interconnected nodes, such as originating node 310, first intermediate node 312, second intermediate node 314, and destination node 318. The optical network communication system 301 can also include fiber optic networks 320-1 and 320-2.

In one or more embodiments, executable instructions can be stored in the memory 374 and executed by the processor 372 to transmit optical data from the originating node 310 to the destination node 318 through the first intermediate node 312 via the first and second fiber optic networks 320-1 and 320-2 and transmit the optical data from the originating node 310 to the destination node 318 through the second intermediate node 314 via the first and second fiber optic networks 320-1 and 320-2 when the first intermediate node 312 fails to transmit the optical data from the originating node 310 to the destination node 318.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. An optical network, comprising:
   an originating node, wherein the originating node is communicatively coupled to a first intermediate node and a second intermediate node by a first fiber optic network;

a destination node, wherein the first intermediate node and the second intermediate node are communicatively coupled to the destination node by a second fiber optic network; and wherein the originating node is configured to transmit optical data to the destination node through the first intermediate node via the first and second fiber optic networks, and wherein the second intermediate node acts as a failover to transmit the optical data from the originating node to the destination node via the first and second fiber optic networks when the first intermediate node fails to transmit the optical data from the originating node to the destination node, and wherein the first intermediate node is configured to broadcast a forwarding notice after transmitting the optical data from the originating node to the destination node and the second intermediate node is configured to discard the optical data stored after receipt of the forwarding notice.

2. The network of claim 1, wherein the originating node broadcasts the optical data to the first intermediate node and the second intermediate node substantially simultaneously via the first fiber optic network.

3. The network of claim 1, wherein the second intermediate node is configured to temporarily store the optical data when the optical data is broadcast from the originating node.

4. The network of claim 1, wherein:
the second intermediate node is configured to transmit the optical data to the destination node if a forwarding notice is not received within a set time period after receiving the optical data from the originating node; and
the second intermediate node is further configured to broadcast a failover acknowledgment after transmitting the optical data.

5. The network of claim 3, wherein the network is configured to modify routing information to bypass the first intermediate node after a set number of failover acknowledgements have been transmitted.

6. The network of claim 2, wherein:
the destination node is configured to broadcast a receipt acknowledgement to the first and second intermediate nodes after receiving the optical data; and
the second intermediate node is configured to discard the optical data after receiving the receipt acknowledgement.

7. The network of claim 6, wherein the second intermediate node is configured to:
transmit the optical data to the destination node if a receipt acknowledgement is not received within a certain time period after receiving the optical data; and
broadcast a failover acknowledgment after transmitting the optical data.

8. The network of claim 1, wherein the originating node, the destination node, the first intermediate node, and the second intermediate node each include a router.

9. The network of claim 1, wherein the first fiber optic network and the second fiber optic network are single-mode fiber optic links with star couplers.

10. A computing system, comprising:
a processor;
a memory in communication with the processor;
an optical communication system in communication with the processor, the optical communication system having an originating node connected to a first intermediate node and a second intermediate node by a first fiber optic network, and a destination node connected to the first intermediate node and the second intermediate node by a second fiber optic network; and executable instructions stored in the memory, and executed by the processor to:
transmit optical data from the originating node to the destination node through the first intermediate node via the first and second fiber optic networks;
transmit the optical data from the originating node to the destination node through the second intermediate node via the first and second fiber optic networks when the first intermediate node fails to transmit the optical data from the originating node to the destination node;
transmit a forwarding notice by the first intermediate node after transmitting the optical data from the originating node to the destination node; and
discard optical data stored on the second intermediate node after receipt of the forwarding notice by the second intermediate node from the first intermediate node.

11. The system of claim 10, wherein the second intermediate node is configured to broadcast a failover acknowledgment after transmitting the optical data from the originating node to the destination node.

12. The system of claim 11, wherein the optical communication system is configured to modify routing information to bypass the first intermediate node after a set number of failover acknowledgements have been broadcast.

13. A method for routing data through an optical network, comprising:
transmitting optical data via a first fiber optic network from an originating node on a first level to a second level;
receiving the optical data at a destination node on a third level from the second level via a second fiber optic network;
wherein the second level, connected to the first fiber optic network and the second fiber optic network, includes:
a first intermediate node as a primary route on the second level for transmitting the optical data from the originating node to the destination node, and
a second intermediate node as an alternate route on the second level for transmitting the optical data from the originating node to the destination node when the first intermediate node fails;
storing the optical data on the second intermediate node when the optical data is transmitted from the originating node to the second level;
broadcasting a receipt acknowledgement when the destination node receives the optical data; and
discarding the optical data stored on the second intermediate node after receiving the receipt acknowledgement from the destination node.

14. The method of claim 13, wherein transmitting the optical data via the first fiber optic network includes broadcasting the optical data to the first intermediate node and the second intermediate node.

15. The method of claim 13, wherein the method includes broadcasting a forwarding notice when the primary route is used for transmitting the optical data from the originating node to the destination node and discarding the optical data stored on the second intermediate node after receipt of the forwarding notice.

16. The method of claim 13, wherein the method includes using the alternative route for transmitting the optical data from the originating node to the destination node when a forwarding notice is not timely received at the second intermediate node.

17. The method of claim 16, wherein the method includes using the alternative route for transmitting the optical data from the originating node to the destination node when the receipt acknowledgement is not timely received at the second intermediate node.

18. The method of claim 13, wherein the method includes broadcasting a failover acknowledgement when the alternate route is used to transmit the optical data from the originating node to the destination node.

19. The method of claim 18, wherein the method includes modifying routing information to include the second intermediate node as a new primary route for transmitting the optical data from the originating node to the destination node when a set number of failover acknowledgements have occurred.

\* \* \* \* \*